Nov. 12, 1935.   J. ZABEL   2,020,449
FUR SHEARING MACHINE
Filed Feb. 6, 1934
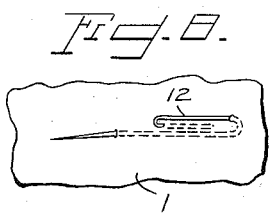
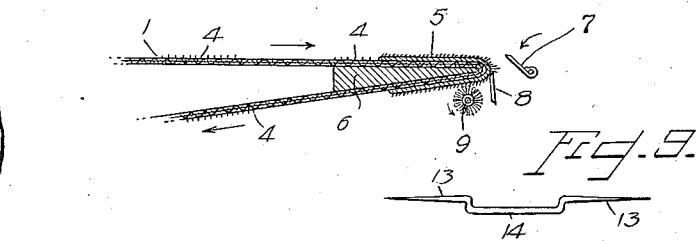
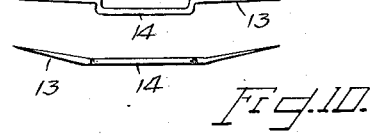
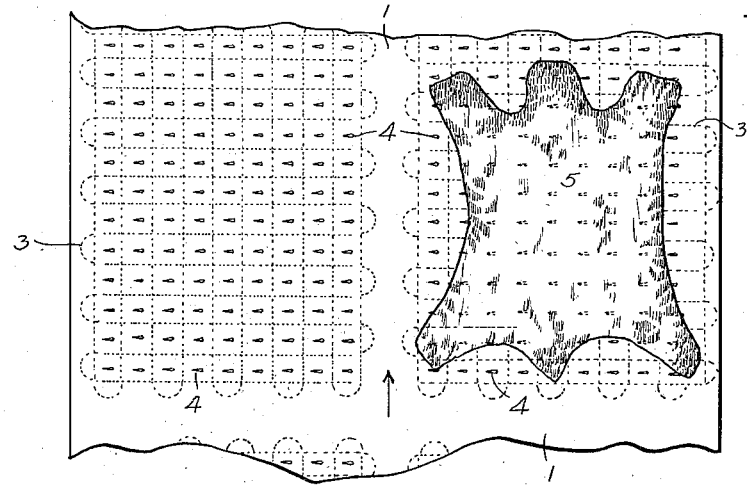
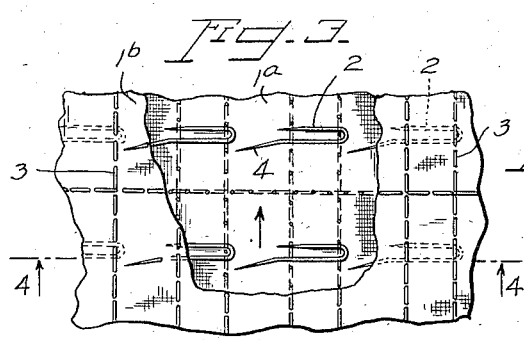
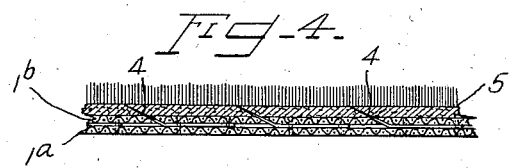
Jacob Zabel
INVENTOR
BY
ATTORNEY.

Patented Nov. 12, 1935

2,020,449

UNITED STATES PATENT OFFICE 2,020,449

FUR SHEARING MACHINE

Jacob Zabel, Newark, N. J.

Application February 6, 1934, Serial No. 710,035

4 Claims. (Cl. 149—24)

This invention relates to new and useful improvements in fur shearing machines, and particularly to pelt conveyors for fur shearing machines.

It is the object of the present invention to provide a conveyor by means of which the pelt is firmly held in place against displacement with respect to the conveyor and in which the holding means of the pelt do not interfere with the shearing operation.

It is customary in machines of the above mentioned kind to anchor pelts to a conveyor of canvas or the like by means of pins. Since these pins penetrate through the skin of the pelt they are likely to come into contact with the knives at the cutting position, dulling the knives and preventing proper shearing of the fur.

In order to guard against this I provide holding means which can contact with the cutting knives over a minimum of their surfaces. In the preferred embodiment herein disclosed, this is attained by providing round pins transversely of the direction of movement of the conveyor and the longitudinal axes of which are parallel with the cutting edges. Preferably, all the pins point in the same direction. Even if it happens that the cutting knife contact with a pin, it will be readily deflected by the curved sides without injuring the cutting edge and the fur will be sheared at all points adjacent to the pin.

In order more fully to explain the nature of my invention I shall describe in detail a practical embodiment thereof, only so much being illustrated as is necessary for an understanding of the features claimed herein.

In the drawing, Fig. 1 is a transverse sectional view of a portion of the shearing machine;

Fig. 2 is a top plan view of a section of the conveyor with one pelt anchored in position;

Fig. 3 is an enlarged top plan view of the conveyor with parts broken away;

Fig. 4 is a vertical cross section along lines 4—4 of Fig. 3; and

Figs. 5, 6, and 7 are elevations of various types of pins that I may use.

Figure 8 is an elevational view of a still further type of pin carried by the conveyor.

Figures 9 and 10 are plan and side elevational views, respectively, of still another type of pin.

Referring now to the drawing, 1 is the canvas conveyor consisting of two sheets of canvas 1a and 1b. Pins such as 2 are arranged in spaced rows between the two sheets 1a and 1b and are held against displacement by stitching 3. A bent-up barb 4 of each pin projects through the top canvas sheet 1b, all the barbs being arranged transversely and substantially at right angles to the direction of movement of the conveyor 1, which is indicated in the figures by means of the arrows. All the barbs are pointed in the same direction and they project through the top sheet 1b at an angle less than ninety degrees to the surface of the conveyor.

A pelt 5 is stretched on the conveyor and the barbs 4, penetrating through the skin portion of the pelt, anchor it in position.

The conveyor is driven by suitable means (not shown) around a guide 6 to the cutting or shearing position shown in Fig. 1. At this position means are provided as indicated at 7 for brushing the soft hair of the fur against the skin, while the stiff hair projects out and is sheared off by the knife, indicated at 8, which moves into place when the brush moves away. Past the knife a brush 9 is provided to comb the hair against the skin. All the pins are substantially parallel with the cutting edge of knife 8 and even if it happened that the knife contacted with a projecting barb 4, the point of contact would be such as to insure the glancing off of the knife without damaging its cutting edge and insuring the shearing off of the stiff projecting hair in close proximity to the barb.

In Fig. 5 a pin 10 is illustrated which, unlike pin 2, has a straight leg by means of which it may be fastened in the canvas conveyor.

In Fig. 7 I illustrate a pin 11, the two legs of which are of the same length.

Obviously, the shape of the pins, as well as the means of fastening them to the conveyor, may be subject to numerous variations.

In Figure 8 the leg 12 not having the barb is bent back upon itself to give a better anchor in the canvas 1. In Figures 9 and 10 the opposite ends of the pin are provided with barbs 13 and the mid portion 14 is offset to provide proper anchoring means for the pin.

What is claimed is:

1. In a fur shearing machine, a conveyor movable longitudinally thereof for carrying the pelt, and a plurality of pins projecting from the conveyor and all pointing in the same direction transversely to the direction of movement of said conveyor.

2. In a fur shearing machine, a conveyor movable longitudinally thereof for carrying the pelt, and a plurality of spaced pins projecting from the conveyor and all pointing in the same direction for engaging the pelt, the longitudinal axes of said barbs being substantially parallel with the cutting edge of the shearing knife.

3. In a fur shearing machine, a conveyor for moving the pelt, and a plurality of rows of spaced barbs fastened to said conveyor and projecting therefrom at an angle less than ninety degrees to the surface of the conveyor, in the same direction for engaging the pelt, the longitudinal axes of said barbs being substantially at right angles to the direction of movement of said conveyor and parallel with the cutting edge of the shearing knife.

4. In a fur shearing machine, a conveyor movable longitudinally thereof for carrying the pelt and a plurality of barbs arranged on the conveyor and all pointing in directions transversely to the direction of movement of said conveyor for engaging the pelt.

JACOB ZABEL.